June 1, 1971  R. H. MARTENS ET AL  3,582,339
PHOTOGRAPHIC ELEMENT
Filed Oct. 30, 1968
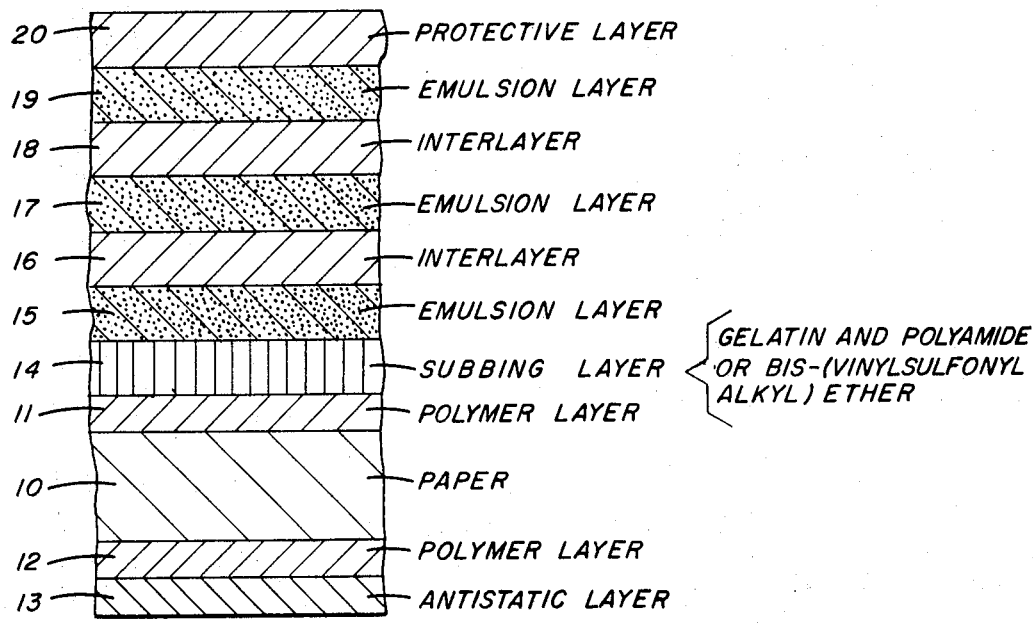
RICHARD H. MARTENS
FRANCIS M. HARTMAN
WILLIAM J. VENOR
INVENTORS
ATTORNEY & AGENT United States Patent Office 3,582,339
Patented June 1, 1971

3,582,339
PHOTOGRAPHIC ELEMENT
Richard H. Martens, Francis M. Hartman, and William
J. Venor, Rochester, N.Y., assignors to Eastman Kodak
Company, Rochester, N.Y.
Filed Oct. 30, 1968, Ser. No. 771,764
Int. Cl. G03c 1/76, 1/30
U.S. Cl. 96—87                                8 Claims

ABSTRACT OF THE DISCLOSURE

The adhesion of photographic layers to corona activated polyolefin surfaces is improved by coating a gelatin subbing layer containing certain gelatin hardening agents onto the corona activated surfaces. The fogging of silver halide emulsion layers coated on the corona activated surfaces is also avoided. The hardening agents include either (1) a water-dispersible polymeric reaction product of epichlorohydrin with a polyamide derived from a polyalkylene polyamine and a dicarboxylic acid or (2) a bis-vinylsulfonyl alkyl ether.

---

Light-sensitive photographic emulsion layers have been coated on transparent film support, reflective film support, or paper surfaces for the preparation of black-and-white or color images for projection or viewing against the reflective surface for many years. The supports comprising the emulsion layers are preferably water-resistant to prevent processing solutions and wash water from penetrating the support and, thus, to decrease the washing and drying time of the processed photographic elements. Since the water-resistant supports are hydrophobic and the emulsion layers are hydrophilic, the emulsion layers do not adhere to the supports during the processing cycle or may not adhere to the support when dry before or after processing. A common method for obtaining both wet and dry adhesion of the emulsion layers to the hydrophobic supports involves coating the supports with a thin "subbing" layer which adheres firmly to the support and to which the emulsion layers will also adhere.

The polyolefins, such as polyethylene, provide excellent surfaces upon which to coat photographic emulsions but since the polyolefins are also hydrophobic they must be treated to effect adhesion of the hydrophilic emulsion layers. It is known to treat the polyolefin surfaces, such as polyethylene coated paper, with corona discharge to cause the emulsions to adhere. This method is very economical particularly since it dispenses with the use of a subbing layer. However, an important use of such supports is in the production of photographic products for color photography where as many as six or more layers are coated upon the corona activated surface. It has been found that, in general, the adhesion of the emulsion layers to the corona activated surface is not as strong as is desirable. Moreover, the corona activated polyolefin surfaces tend to fog the color emulsion layers and an irregular electrostatic charge on the polyolefin surface usually causes the emulsion to be coated irregularly. In addition, it is found that the hydrophilic photographic layers have very poor adhesion to the corona activated polyolefin surface unless the layers are coated on the activated surface within about four days. The desired degree of adhesion does not appear to be obtainable by omission of corona activation and use of a subbing layer alone.

We have discovered that the desired adhesion of the hydrophilic layers, such as emulsion layers, to corona activated polyolefin surfaces, such as polyethylene coated paper, can be obtained by use of gelatin subbing layers containing certain gelatin hardening agents. Also, the coating of these subbing layers tends to prevent fogging of the emulsion layers by any electrostatic charge on the polyolefin surface and the emulsion layers coat uniformly on the polyolefin surfaces provided with the subbing layers. In addition, the emulsion layers coat with good adhesion on the subbing layers several months after storage as shown in the examples below.

The compositions which we use to provide the gelatin subbing layers include either (1) A mixture of gelatin and a water-dispersible polymeric reaction product of epichlorohydrin with a polyamide derived from a polyalkylene polyamine and a dicarboxylic acid; or (2) A mixture of gelatin and a bis-vinylsulfonyl alkyl ether.

One difficulty in finding a suitable gelatin hardening agent for the subbing layers resided in the fact that many gelatin hardening agents, such as formaldehyde, are active toward photographic emulsions, particularly emulsion layers used in color photography. While many gelatin compositions have been recommended for subbing layers for photographic film base, such as cellulose ester and polyester film supports, these prior gelatin compositions have not been found to possess the required combination of properties for use on the corona activated polyolefin surface to obtain the desired adhesion and to prevent adverse effects of the electrostatic charge on the emulsion layers.

The polymeric components of the gelatin subbing composition (1) are prepared, for example, as described in U.S. Pat. 2,926,154, Example 2, by heating a polyalkylene polyamine, such as triethylene tetraamine, with a dicarboxylic acid, such as adipic acid, so as to yield a water-dispersible polyamide. Thereafter, the polyamide is heated with epichlorohydrin. The acids are preferably saturated dicarboxylic acids of 3 to 8 carbon atoms and include adipic acid, glutaric, succinic, malonic, etc. acids. The polyamines preferably contain two primary amine groups and at least one secondary amine group as present in, e.g., diethylenetriamine, triethylenetetraamine, tetraethylenepentamine, dipropylenetriamine, and the like, or mixtures thereof.

The structures of these polymers are not known with certainty although long polyamide chains appear to be present and the polymers are cationic. The gelatin subbing composition (1) is prepared by dispersing these cationic polyamides in an aqueous solution of gelatin, a surfactant is preferably added, and the composition is coated upon a freshly corona activated polyolefin surface or about one to three days later when the surface is still in the active condition. The resulting subbing layer is preferably dried at, e.g., 70–100° F. or higher, before coating a photographic emulsion layer thereon. The emulsions can also be coated upon the moist or wet gelatin subbing layer. The polyamide appears to coact with the gelatin to produce a subbing layer of properties intermediate those of the corona activated polyolefin surface and of gelatin, so that photographic gelatin layers will strongly adhere to the polyolefin surface.

In the case of polyethylene or polypropylene surfaces, the gelatin subbing composition (1) can contain about 1 to 10% by weight of the cationic polyamide based on the amount of gelatin present and the composition can be coated at a dry weight of about 1 gram per square meter of corona activated surface. However, different gelatin photographic emulsions, free of or containing color couplers, and different polyolefin surfaces can be expected to require more or less than these amounts of gelatin and polyamide hardener for optimum economy and adhesion.

The bis-vinylsulfonyl lower alkyl ether components of the gelatin subbing composition (2) are compounds which have the general formula:

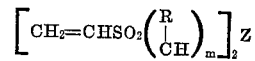

wherein R represents hydrogen or lower alkyl of 1 to 4 carbon atoms;

m is a positive integer of from 1 to 4; and

Z represents oxygen.

Representative useful compounds having this formula are bis(2 - vinylsulfonylethyl)ether, bis(vinylsulfonylmethyl) ether, and bis(4-vinylsulfonylbutyl)ether. The preparation of these compounds is disclosed in Burness et al., U.S. Ser. No. 682,525, filed Oct. 13, 1967. The related compounds wherein Z represents nitrogen, alkyl nitrogen, quaternized nitrogen or quaternized alkyl nitrogen, etc. are known but are not as useful as gelatin hardening agents in the gelatin subbing layers. Similarly, the related compound 1,2-bis(2-vinylsulfonyloxy)ethane is not as useful. The ether compounds of the invention have a superior combination of gelatin hardening properties for the subbing layers and inertness to silver halide emulsions.

These vinylsulfonyl ether compounds are dispersed in aqueous gelatin solutions preferably adding surfactants to facilitate coating. In the case of bis(2-vinylsulfonylethyl)ether on polyethylene surfaces, about 0.1 to 10, preferably about 0.1 to 3.0%, by weight based on the gelatin is useful. The gelatin solutions are then coated on the freshly activated polyolefin surfaces or before activation disappears, at a dry weight of about 1.0 gram per square meter. Different photographic emulsions and polyolefin surfaces can be expected to require different amounts of gelatin and the vinylsulfonyl ether hardeners for optimum economy and adhesion.

The accompanying drawing shows in greatly enlarged cross-sectional view the appearance of a representative photographic element for color photography prepared according to the process of the invention.

Layer 10 is a photographic paper base of, e.g., 30 pounds per 1,000 square feet, carrying extruded polyethylene layers 11 and 12 and the antistatic layer 13. The upper surface of polyethylene layer 11 is corona activated and coated with a thin gelatin subbing layer 14 from subbing compositions (1) and (2) described above to provide adhesion for photographic layers such as silver halide emulsion layers 15, 17 and 19 and to avoid deleterious effects of the corona activated polyethylene surface on the emulsion layers. Interlayers 16 and 18 and the protective layer 20 are, for example, gelatin layers. The polyolefin surfaces which are activated with corona discharge and coated with the subbing compositions (1) or (2) above are provided by polyolefin films or paper and the like coated with polyolefins, such as polyethylenes, polypropylenes, ethylene-propylene copolymers, polystyrenes and polybutenes. Paper and laminated glassine paper coated with these polymers are especially useful. An external antistat layer 13 can be coated on the polymer surface opposite that to be coated with the photographic emulsion layer. Antistatic material particularly useful in this layer is a mixture of a (1) colloid such as hydroxymethyl cellulose, (2) colloidal silica and (3) either an alkali metal salt of 2,5-naphthalene disulfonic acid, an alkali metal salt of a lower alkyl naphthalene sulfonic acid, and alkali metal salt of the condensation product of formaldehyde and 2,5-naphthalene disulfonic acid, an alkali metal salt of an alkyl aryl polyether sulfonate or an alkali metal salt of a polymeric carboxylic acid. The compound p-(1,1,3,3-tetramethylbutyl)phenoxyethoxyethyl sodium sulfonate is especially useful. Carbon black can also be used in the polymer layers. The antistatic layers are described in more detail in Miller et al,. U.S. patent application Ser. No. 594,226 filed Nov. 14, 1966. An internal antistatic material can be incorporated into the polymer support, into the paper or on the surface of paper which is coated with the above polymeric materials or into the polymer layers on the paper. Antistatic materials especially useful for this purpose include salts such as the alkali metal and ammonium salts of the condensation products of an aldehyde such as formaldehyde with naphthalene sulfonic acids, salts such as sodium sulfate and the like salts of organic compounds, organic antistatic agents, such as triethanolamine oleate, triethanolamine stearate and various polyalkylene polyamine derivatives. Oxyalkylene amine derivatives of phosphorus, polyacryloxyalkyl trialkyl ammonium alkylsulfate salts, diethanol amine salts of phosphate esters, carbon black and the like may also be used. The above external antistatic layers augment the internal antistatic method for overcoming static problems. Chu et al., U.S. Pat. 3,253,922 describes this method for providing internal antistatic protection to polymer coated papers.

The photographic layers which are coated on the subbing layers (1) or (2) above include all kinds of hydrophilic organic colloid layers such as gelatin interlayers, gelatin filter layers and gelatin-silver halide emulsion layers. The silver halide can be, e.g. silver bromide, silver iodide, silver chloride or mixed crystals of these silver halides, e.g. silver chlorobromide. The hydrophilic organic colloid of these layers is preferably gelatin but it may be replaced wholly or in part by known gelatin derivatives, water-soluble polymers such as partially hydrolyzed cellulose acetate, cellulose methyl ether, polyvinyl alcohol, hydrolyzed vinyl acetate copolymers, vinyl acetal-vinyl alcohol copolymers, alkylacrylate-acrylic acid copolymers, etc. Emulsion layers coated on the subbing layers, and which are particularly susceptible to the deleterious effects of the corona activated polymer surfaces, are the incorporated coupler gelatin-silver halide emulsion layers well known in the art. These emulsions contain colored or colorless non-diffusing cyan, magenta and yellow dye-forming coupler compounds. The subbing layers are used particularly to enhance the adhesion of the coupler-containing emulsion layers to the activated polyolefin surfaces. Representative elements for color photography shown in the drawing comprises superposed in the desired order on the subbing layer 14 red, green and blue light-sensitive silver halide emulsion layers containing, respectively, a cyan-forming coupler (e.g. a phenolic compound), a magenta-forming coupler (e.g. a 5-pyrazolone compound) and a yellow-forming coupler (e.g. an open chain ketomethylene compound). Suitable non-diffusing couplers are disclosed in U.S. Pats. 2,407,293, 2,640,776 and 2,956,876. The couplers can be incorporated into the emulsion layers in accordance with well-known procedures, e.g. using coupler solvents as described in U.S. Pat. 2,322,027 to Jelley et al.

The elements of the invention, prepared as described by coating one or a plurality of differently sensitized emulsion layers on the corona activated polymeric surfaces carrying subbing layer 14, after exposure to a subject are processed in the usual manner by use of silver halide developing solutions, fixing solutions, etc. The sensitive elements having the superposed incorporated coupler emulsion layers can be exposed to color negatives and processed directly to color positives by use of conventional developer solutions containing primary aromatic amino silver halide developing agents. Silver images are then bleached and removed along with the residual silver halide leaving the subtractively colored dye images in the layers. It is in this process that it is necessary that the emulsion in contact with the support (and, of course, all emulsions), not be fogged or otherwise adversely affected when coated on the corona activated polymer surface, since fog produces, e.g. yellow stain in highlights and on the borders of the prints.

These multilayer color elements can also be processed by reversal to color positives. Thus, the element is exposed, for example, to a subtractive color transparency, and as usual, developed with a black-and-white developer solution (a so-called MQ developer), the residual silver halide is then rendered developable by fogging with light or using chemical fogging and a color developing solution is used to form the positive dye images in the layers. Silver and residual silver halide are removed by known methods leaving the dye images in the layers.

Corona activation of the polyolefin surfaces is conveniently carried out using as a power supply a known spark-gap type power supply which has current supplied to the electrodes by a spark-gap excited oscillator in a well-known manner. Variation in fundamental frequency of the corona is obtained by changing the primary power frequency of the oscillator. A high voltage corona is desirable, e.g. 25,000 to 50,000 volts or higher measured peak to peak. Voltages of this range are adequate for corona activation of polymers at web speeds of about 100 to 1,000 feet per minute or higher. Voltage is varied by spacing the spark gaps and by varying the primary voltage to the oscillator. Due to the inefficiencies of the spark-gap power supply a continuous wave generator can be used. This sort of waveform generator is available from simple rotating motor-generator sets and frequency control is obtained by speed control of the driving motor. Continuous wave corona is obtained by using as the power source a motor-generator set whereby a sinusoidal waveform generator with a fixed number of poles is driven by a variable speed motor, giving a variable frequency sine wave output. Variation in frequency of the continuous wave corona is obtained by varying the speed of the driving motor. Voltage of the continuous wave corona which is stepped up in value by a multitap transformer and varied by field control can vary from about 5,000 volts to 30,000 volts or higher at web speeds of about 100 to 1,000 f.p.m. The corona can be applied to the polymeric surface of the support, for example, by means of several metal electrodes positioned close to the polymeric surface at a point ahead where the polymeric surface is passing over a grounded electrode metal roll coated with a dielectric material such as linear polyester and the electrodes being connected to the power source. Similarly, a metal roller may be used to support the web having a polyolefin surface with the other electrode array being in planetary disposition equidistant from the surface of the metal roller and each being coated with a dielectric, at least on the surface nearest the metal roller. The spacing of the electrodes to the polymer surface and ground roll should be adequate to produce an activating corona at the voltage used and yet allow for free passage of polymeric sheet through the activating zone. Corona supplied by DC current, or a combination of AC superimposed on DC can be used.

The following examples will serve to illustrate our invention.

EXAMPLE 1

Photographic paper base, preferably containing an antistat material such as described in U.S. Patent 3,253,922, is extrusion coated on both sides with polyethylene at about 8 pounds per 1,00 square feet. The polyethylene surface on the wire side of the paper is preferably corona activated as described above and an antistatic layer such as described in Miller et al., U.S. patent application Ser. No. 594,226, filed Nov. 14, 1966 (French Patent 1,556,240), which is now abandoned and replaced by continuation-in-part Ser. No. 704,714, filed Feb. 12, 1968, now U.S. Patent No. 3,525,621, is coated upon the corona activated surface. The other polyethylene surface on the face side of the paper is activated with corona discharge as described above, for example, using 60 Hz., 50,000 volt AC corona at 125 feet per minute. The resulting activated polyethylene surface is then coated with a subbing composition prepared from 322 grams of a 7% gelatin solution to which is added 0.6 cc. of a 5% aqueous solution of the gelatin hardener bis(2-vinylsulfonylethyl)ether followed by dilution to 900 cc. with water. The composition contains 0.5% bis(2-vinylsulfonylethyl)ether based on the amount of gelatin present. The composition is coated at about 15 f.p.m. on the activated polyethylene surface at 1 gram per square meter (dry weight) and dried at about 150° F. The resulting subbed polyethylene surface is then coated with layers 15 to 20 shown in the drawing. If desired, the layers can be coated simultaneously from a multiple coating hopper such as described in U.S. Patent 2,761,791. Layers 16, 18 and 20 are gelatin layers. Layers 15, 17 and 19, are respectively, primarily blue, green and red light-sensitive coupler-containing gelatin-silver halide emulsion layers of the type described in Example 2 of Van Campen, U.S. Patent 2,956,879. The couplers are of the usual non-diffusing type yielding dye images of color complementary to the sensitivity of the emulsion layer in which they are present. The resulting element is exposed and processed by known color development methods to form dye images in the emulsion layers. As a result, the adhesion of the emulsion layers while still moist from processing to the subbed polyethylene surface is satisfactory when tested as described in Example 2, and is substantially better than the adhesion to the control sample which has no subbing later on the corona activated polyethylene surface. Also, no emulsion fog is observed for the product having the gelatin subbing layer whereas the control sample which has been corona activated just before coating the emulsion layers exhibits significant yellow stain due to fogging of the blue sensitive emulsion layer by the corona activated surface. As a further result, the color emulsions coat more uniformly on the gelatin subbed polyethylene surface than on the control paper which has no subbing layer on the corona activated polyethylene surface. Apparently, the subbing operation at least reduces the irregularity of the electrostatic charge on the surface and, thus, the ribbon of emulsion is not disturbed during the separate coating operation.

EXAMPLE 2

(A) A polyethylene coated paper stock provided with antistat materials and corona activated as in Example 1 is coated with an aqueous subbing composition prepared from 322 grams of a 7% gelatin solution to which is added 0.6 cc. of a 5% aqueous solution of the gelatin hardener bis(2-vinylsulfonylethyl)ether followed by dilution to 900 cc. with water. The composition contains 0.5% bis(2-vinylsulfonylethyl)ether based on the amount of gelatin present. The composition is coated on the activated polyethylene surface at 1 gram per square meter (dry weight).

(B) The same polyethylene coated paper stock used in A is activated and coated with a polymeric subbing composition prepared as follows: To 300 grams of a 7% aqueous gelatin solution is added 32 grams 5% aqueous solution of the water-dispersible polymeric reaction product of epichlorohydrin with a polyamide derived from triethylenetetraamine and adipic acid as in U.S. Patent 2,926,154, Example 2, as a gelatin hardening agent, followed by dilution with water to 900 cc. The composition contains 7.6% of the polymeric gelatin hardening agent based upon the weight of gelatin present. The subbing composition is coated from a hopper onto the activated polyethylene surface at about 15 f.p.m. at a coverage of 1 gram per square meter (dry weight) and dried at about 150° F.

(C) The same polyethylene coated stock is corona activated just before coating the emulsions.

The subbed papers A and B, and control paper C are then sensitized, respectively in order, with primarily blue, green and red light-sensitive gelatin-silver halide emulsion layers of the type described in Example 2 of Van Campen U.S. Pat. 2,956,879 to provide an element appearing substantially as shown in the drawing. The couplers are the usual non-diffusing type yielding dye images of color complementary to the sensitivity of the emulsion layer in which they are present. The papers are then exposed and processed by known color development methods to form dye images in the emulsion layers. The wet adhesion of the emulsion layers freshly coated, after four weeks natural aging at 70° F., 50%

RH and after three days incubation at 90% RH and 120° F. is shown in the following table.

TABLE I

| | Adhesion | | |
|---|---|---|---|
| | Fresh | Four weeks natural aging | Three days incubation |
| Paper A | 2 | 2 | 1 |
| Paper B | 2 | 1 | −1 |
| Paper C, control (no sub) | 3 | 3 | 1 |

The adhesion values in the above table are obtained by scratching the processed moist emulsion surfaces with stylii of different weights until a scratch is visible. Thus, in the table, a value of 1 means good adhesion is obtained and a value of 5 represents unacceptable adhesion. The value −1 indicates exceptionally good adhesion for Paper B containing the polymeric hardener. The data indicates that the subbed samples A and B have substantially better adhesion both when freshly processed and when processed after four weeks natural aging and after three days incubation.

EXAMPLE 3

The process of Example 2A is carried out in the same manner except that concentrations of 1.5% and 3% as well as 0.5% of bis(2-vinylsulfonylethyl)ether gelatin hardener is used in the gelatin subbing composition. The following table shows the adhesion values on fresh samples and four weeks natural aged samples. The data show the advantageous use of from 0.5 to 3% of the gelatin hardener in the subbing layer on the activated surface, compared to the use of no subbing layer on the activated surface (control paper). As mentioned above, it can be expected that different photographic emulsions and other corona activated polyolefin surfaces may allow, or require, more or less than this concentration of this type of gelatin hardening agent.

TABLE II

| | Adhesion | |
|---|---|---|
| | Fresh | Four weeks natural aging |
| Control paper | 4.0 | 3.0 |
| Hardener, 0.5% | 2.0 | 1.0 |
| Hardener, 1.5% | 2.0 | 1.0 |
| Hardener, 3.0% | 2.0 | 1.0 |

As in Example 2, the subbing compositions all provided surfaces which are uniformly coated with the color emulsion layers.

EXAMPLE 4

The process of Example 2 is carried out using the same corona activated polyethylene coated paper stock provided with antistat materials. A control paper carries no subbing layer on the activated polyethylene surface and Paper A carries a subbing layer coated from the same gelatin composition described in Example 2A containing 0.5% of the bis(2-vinylsulfonylethyl)ether gelatin hardener. Paper B has a subbing layer prepared in the same manner as described in Example 2B containing 7.6% of the polymeric hardener based on the amount of gelatin present. The subbing layers of Papers A and B are coated at 1 gram per square meter (dry weight). Papers A and B are coated with the three color emulsions within about three days of coating the subbing layers. The control paper is corona activated just before coating the emulsions. The following table shows the adhesion values after color processing these papers each carrying the three color emulsion layers. The table also shows relative yellow stain values, resulting from an effect of the coating surfaces on the blue-sensitive emulsion layer, obtained by measuring the yellow density of an unexposed area of each paper sample. The stain values of .120 and .140 are acceptable whereas the value of .200 represents unacceptable stain. In this stain evaluation a .010 difference in yellow density is discernible and significant.

TABLE III

| | Adhesion | | | |
|---|---|---|---|---|
| | Fresh | Four weeks natural aging | Three days incubation | Fresh yellow stain |
| Control paper | 3 | 3 | 3 | .200 |
| Paper A | 2 | 2 | 2 | .140 |
| Paper B | 5 | 2 | 3 | .120 |

The unacceptable adhesion value of 5 shown in the table, compared to the value of 2 for fresh Sample B, Table I comprising the same subbing layer, cannot be explained and may be due to a testing error particularly since in a subsequent coating where this Example 4B was repeated the fresh adhesion value of 2 was again obtained. It is apparent from the data that the subbing layers of Samples A and B impart substantially better adhesion to the fresh, natural aged and incubated samples.

EXAMPLE 5

Sample A of a polyethylene coated paper support provided with antistat materials and corona activated as in Example 1, is immediately coated with the same gelatin solution containing the polyamide hardener as described in Example 2B, at a coverage of 1 gm./m.² dry weight.

Sample B of the same corona activated support is also immediately coated with the same gelatin solution containing the bis(2 - vinylsulfonylethyl)ether hardener described in Example 2A at a coverage of 1 gm./m.² dry weight.

Samples A and B each carrying a gelatin subbing layer are aged at 70° F. and 50% RH for the periods of time shown in the following table. Thereafter, the color emulsion layers described in Example 2 are coated on the aged samples A and B to provide photographic elements of structures substantially as shown in the drawing. The resulting products A and B are then processed by the usual color development methods to form dye images in the emulsion layers. The moist samples of A and B are then tested for adhesion of the emulsion layers to be subbed polyethylene surface by a test in which the operator manually scratches the emulsion surface, rubs the scratch with his finger, and visually estimates the degree of adhesion. A value of 10 is assigned to samples having poor adhesion and a value of 1 or 2 for samples having good adhesion. The following table shows the adhesion of samples A and B after 12 to 89 days aging. Only the 40-day aged sample A was tested. It is not understood why the 12-day aged sample B did not exhibit better adhesion. Other coatings having the same gelatin-polymer subbing layer had excellent adhesion when emulsion coated fresh (Example 2A) or in 10–20 days. The data shows that polyolefin coated papers can be subbed with the gelatin composition and aged for long periods of time before sensitizing and good adhesion results. Also, the emulsions are not fogged. As mentioned above, photographic emulsions do not adhere to the corona activated polyethylene surfaces (free of the subbing layer) if the surfaces are aged for about four days before coating the emulsion layers. In addition, the polyethylene surface freshly activated for optimum adhesion tends to fog the emulsions.

TABLE IV

| | Adhesion | | | | |
|---|---|---|---|---|---|
| | 12 days | 23 days | 40 days | 68 days | 89 days |
| Sample A | | | 2 | | |
| Sample B | 10 | 2 | 1 | 1 | 1 |

In the manner of the above examples the other polyolefin surfaces in sheet form, e.g., polyethylene or polypropylene films, or as polyolefin coatings on supports such as paper, can be corona activated and provided with subbing layers of compositions (1) or (2) above for adhering hydrophilic layers such as black-and-white emulsions or a plurality of color emulsions to the polyolefin surfaces. Compositions (1) and (2) can be expected to give superior emulsion adhesion and other favorable properties compared to similar compositions containing a mixture of gelatin and, for example, colloidal silica which have been used for adhering photographic emulsions directly to polyolefin surfaces. It has also been found that a composition containing a mixture of 75 parts by weight of colloidal silica and 10 parts by weight of a hydrophilic copolymer of about 90% acrylamide and 10% 2-acetoacetoxyethylmethacrylate can be used as a subbing layer on the corona activated polyolefin surfaces but the adhesion of the photographic gelatin layers is not as good as provided by compositions (1) and (2) above.

As shown by the above examples, the use of the gelatin subbing layers on the corona activated polyolefin surface results in improved adhesion of photographic emulsion layers coated thereon and these emulsion layers are not fogged by the corona activated surface. However, in this subbing process it is usually desirable to either regulate the frequency of the corona discharge or to reduce any irregularity of the electrostatic charge on the polyolefin surface so that the subbing composition and emulsion layers will coat with optimum uniformity. Thus, in the first method, a current frequency greater than about 200 Hz. can be used so the ribbon of gelatin subbing composition will coat with optimum uniformity at the selected speed on the corona activated surface. This process is described in more detail in the Ambusk, U.S. patent application Ser. No. 724,491 filed Apr. 26, 1968. In a second method the polyolefin surface may be activated in a manner which produces an irregular electrostatic charge on the polyolefin surface, for example, by use of a 60 cycle, 50,000 volt corona at 125 f.p.m. and then passing the activated surface between a pair of electrodes, one being in contact with the surface and connected to a DC power supply and the other electrode grounded, to at least produce a uniform electrostatic charge on the surface. This process is described in detail in the Kerr et al., U.S. patent application Ser. No. 728,641 filed May 13, 1968.

In the above description we have shown that the adhesion of hydrophilic organic colloid layers to corona activated polyolefin surfaces is substantially improved by coating the activated surfaces with either subbing composition (1) or (2). The polyolefin surfaces may be activated for adhesion of the hydrophilic layers by means other than corona discharge. For example, open flame can be applied to the polyolefin surface as described in U.S. Patents 2,632,921, 2,648,097, 2,683,894, 2,704,382 and 2,746,084 to activate the surface. Similarly, chemical methods known in the art can also be used to activate the polyolefin surface, e.g. oxidizing solutions such as acid dichromate solution.

The invention has been described in detail with particular reference to preferred embodiments thereof, but it will be understood that variations and modifications can be effected within the spirit and scope of the invention.

We claim:
1. A photographic element comprising a support having a polyolefin surface activated by corona discharge and a subbing layer on said activated surface of (1) a mixture of gelatin and as a hardening agent a water-dispersible polymeric reaction product of epichlorohydrin with a polyamide derived from a polyalkylene polyamine and a dicarboxylic acid, or (2) a mixture of gelatin and as a hardening agent a bis(vinyl-sulfonyl lower alkyl)ether.

2. The element of claim 1 wherein the subbing layer is a mixture of gelatin and a water-dispersible polymeric reaction product of epichlorohydrin with a polyamide derived from a polyalkylene polyamine and a dicarboxylic acid.

3. The element of claim 1 wherein the subbing layer is a mixture of gelatin and a bis(vinylsulfonyl lower alkyl) ether.

4. The element of claim 2 further having differently sensitized gelatin-silver halide emulsions coated upon the subbing layer which is coated on a corona activated polyethylene or polypropylene surface.

5. The element of claim 3 further having differently sensitized gelatin-silver halide emulsions coated upon the subbing layer which is coated on a corona activated polyethylene or polypropylene surface.

6. The element of claim 2 wherein the subbing layer contains a mixture of gelatin and a water-dispersible polymeric reaction product of epichlorohydrin with a polyamide derived from triethylenetetraamine and adipic acid.

7. The element of claim 3 wherein the subbing layer contains a mixture of gelatin and bis(vinylsulfonylmethyl)ether or bis(2-vinylsulfonylethyl) ether, or mixtures of said ethers.

8. A photographic element comprising a support having a polyolefin surface activated for adhesion of a hydrophilic organic colloid layer thereto and a subbing layer on said activated surface of (1) a mixture of gelatin and as a hardening agent a water-dispersible polymeric reaction product of epichlorohydrin with a polyamide derived from a polyalkylene polyamine and a dicarboxylic acid, or (2) a mixture of gelatin and as a hardening agent a bis(vinylsulfonyl lower alkyl)ether.

References Cited
UNITED STATES PATENTS

| | | | |
|---|---|---|---|
| 3,037,862 | 6/1962 | Neth | 96—87X |
| 3,224,986 | 12/1965 | Butler et al. | 117—139.4X |
| 3,260,602 | 7/1966 | Wood et al. | 96—87X |
| 3,359,107 | 12/1967 | Goffe et al. | 96—87X |
| 3,411,908 | 11/1968 | Crawford et al. | 96—87X |

FOREIGN PATENTS

| | | | |
|---|---|---|---|
| 750,323 | 1/1967 | Canada | 96—87 |

WILLIAM D. MARTIN, Primary Examiner

R. HUSACK, Assistant Examiner

U.S. Cl. X.R.

96—85; 117—34, 47, 76, 83, 138.8; 260—6